United States Patent
Schaefer

[15] 3,658,666
[45] Apr. 25, 1972

[54] PROCESS FOR ADDING ON COMPOUNDS CONTAINING CARBON ANIONS

[72] Inventor: Hans Schaefer, Eddigehausen, Germany

[73] Assignee: Badische Anilin- & Soda-Fabrik Aktiengesellschaft, Ludwigshafen am Rhine, Germany

[22] Filed: Oct. 22, 1969

[21] Appl. No.: 868,620

[30] Foreign Application Priority Data

Oct. 29, 1968 Germany..................P 18 05 764.2

[52] U.S. Cl.................................................204/59
[51] Int. Cl..............................................B01k 3/00
[58] Field of Search....................................204/59

[56] References Cited

OTHER PUBLICATIONS

J. Chem. Soc., Volume C, 1967, page 1,352.

Primary Examiner—John H. Mack
Assistant Examiner—Neil A. Kaplan
Attorney—Johnston, Root, O'Keeffe, Keil, Thompson & Shurtleff

[57] ABSTRACT

A process for adding on compounds containing carbon anions to olefinic compounds in which the double bond is not activated, which comprises the anodic oxidation of compounds containing carbon anions in the presence of both an olefinic compound in which the double bond is not activated and a polar solvent. The products are suitable for further synthesis and for the production of biologically active substances.

5 Claims, No Drawings

PROCESS FOR ADDING ON COMPOUNDS CONTAINING CARBON ANIONS

This invention relates to a process for adding on compounds containing carbon anions to olefinically unsaturated compounds in which the olefinic double bond is not activated.

It is known from Ber. 85, 630 et seq. (1952) that oxygen anions, such as acetate anions or propionate anions, can be added on by anodic oxidation to olefinically unsaturated compounds which are capable of free radical polymerization. The method has the disadvantage however that the oxygen radicals primarily formed decompose with the elimination of carbon dioxide so that not only the radicals primarily formed are added on to the olefinic double bond. It is moreover stated in J. Chem. Soc., volume C, 1967, page 1,352, that diethyl sodium malonate can be dimerized by anodic oxidation. It is not the object of this lastmentioned method to add on carbon anions to non-activated olefinic double bonds. It is an object of this invention to provide a process in which carbon anions can be added on to olefinic double bonds in a simple manner.

In accordance with this invention this and other objects and advantages are obtained in a process for adding on compounds containing carbon anions to olefinically unsaturated compounds in which the olefinic double bond is not activated which comprises anodic oxidation of compounds containing carbon anions in the presence of both an olefinically unsaturated compound in which the olefinic double bond is not activated and a polar solvent.

The invention is based on the general concept that carbon anions can be converted by anodic oxidation into the corresponding radicals and these can be added on to non-activated olefinic double bonds. Possible steps in the anodic oxidation of dimethyl sodium malonate in the presence of styrene are illustrated in the following equations:

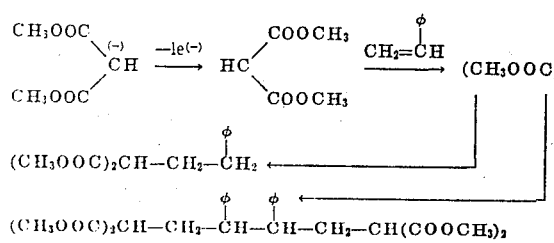

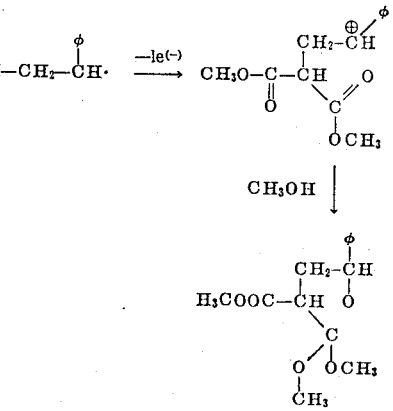

Compounds containing carbon anions are used as starting materials. Preferred starting materials are anions having the formula $Z^-$ where $Z$ has the following meanings:

a. the radical $R^1$-CH-$R^2$ where $R^1$ and $R^2$ each denotes an acyl group having two to ten carbon atoms or a carboxylic ester group having two to 10 carbon atoms which is derived from an aliphatic, cycloaliphatic or araliphatic alcohol having up to nine carbon atoms or from phenol, especially an alkanol having one to six carbon atoms, a cycloalkanol having six to eight carbon atoms or an aralkanol having seven to eight carbon atoms. In the said radicals $R^1$ and $R^2$ may also each denote a nitrile or phenyl group or a sulfonic group which may bear as substituent an aliphatic, cycloaliphatic, araliphatic or aromatic radical having up to ten carbon atoms, particularly an alkyl, cycloalkyl or aralkyl radical having up to eight carbon atoms, or a phenyl radical;

b. the radical

where $R^3$ and $R^4$ each denotes a hydrogen atom or an aliphatic, cycloaliphatic, araliphatic or aromatic radical having up to 10 carbon atoms, particularly an alkyl, cycloalkyl or aralkyl radical having up to eight carbon atoms, or a phenyl radical, and X denotes a nitro group;

c. the radical $R^5$-C≡C where $R^5$ denotes a hydrogen atom, an alkyl radical having one to four carbon atoms or a phenyl group; or d. a cyanide or azide anion.

The cations for the anions set out under (a) to (d) are preferably those of metals of main group I of the Periodic System, particularly sodium and potassium.

e. suitable starting materials also include Grignard compounds having the general formula R-Mg-X where R denotes an aliphatic, cycloaliphatic, araliphatic or aromatic radical having up to ten carbon atoms, particularly an alkyl, cycloalkyl or aralkyl radical having up to eight carbon atoms, or a phenyl radical, and X denotes a chlorine or bromine atom.

Starting materials which are particularly preferred are those derived from radicals set out under (a), (b), (c) and (d), particularly under (a).

Olefinically unsaturated compounds for the purposes of the reaction in which the olefinic double bond is not activated are those which will not enter into a Michael reaction. Preferred olefinically unsaturated compounds are aliphatic olefins having three to twenty carbon atoms and cycloaliphatic olefins having five to twelve carbon atoms. The olefins may contain one to three olefinic double bonds. Olefins or cycloolefins having the said number of carbon atoms and which contain one olefinic double bond are particularly preferred. Other suitable olefinically unsaturated compounds are vinyl ethers, particularly vinyl alkyl ethers having three to ten carbon atoms, or araliphatic olefins such as styrene or vinylnaphthalene.

It is advantageous to use for each mole of anionic compound from 1 to 100 moles, particularly from 1 to 10 moles, of olefinically unsaturated compound in which the double bond is not activated.

The anodic oxidation is advantageously carried out at anode voltages of 0.1 to 1.2 volts measured against a silver/silver chloride electrode and 0.01 to 0.1, particularly from 0.02 to 0.08, ampere. If it is desired to produce a larger proportion of dimerization products, it is advantageous to use anode voltages of from 0.1 to 0.4 volt. If it is desired to increase the proportion of furan derivatives, an anode voltage of from 0.6 to 1.2 volts is advantageously maintained. It is advantageous to use electrodes which are not changed by anodic oxidation, particularly electrodes of precious metals or of carbon. Platinum electrodes have proved to be particularly suitable. Anodic oxidation may be carried out using a diaphragm between the electrodes. It is advantageous however to carry out the anodic oxidation without the use of a diaphragm. The anodic oxidation is generally carried out at temperatures of from −10° to +100° C. Particularly good results are obtained when temperatures of from 0° to 60° C are maintained.

Anodic oxidation is carried out in the presence of a polar solvent. Alkanols having one to four carbon atoms, aliphatic nitriles having two to three carbon atoms such as acetonitrile, sulfoxides such as dimethylsulfoxide, and disubstituted amides such as dimethylformamide have proved to be particularly suitable as polar solvents. It is also possible to use mixtures of the said solvents.

The process according to the invention may be carried out for example by placing a mixture of the said compounds containing carbon anions, olefinically unsaturated compounds and polar solvents in an electrolytic cell which is fitted with platinum electrodes and carrying out the anodic oxidation under the specified voltage and current density and the said temperature conditions. Conversion is determined by the amount of current measured in coulombs. The reaction mixture obtained is separated into its indicidual constituents by a conventional method, for example by fractional distillation. Unreacted starting materials and recovered polar solvent may be used again.

Compounds prepared by the process according to the invention are suitable for the production of plastics, pest control agents and biologically active products.

The invention is illustrated by the following Examples.

EXAMPLE 1

A solution of 18 g of dimethyl malonate and 1.1 g of sodium in 100 ml of styrene and 120 ml of methanol is electrolyzed at 20° C with an anode voltage of +0.35 volt and a current density of 0.02 amp/cm$^2$. After a current consumption of 16,200 coulombs the elctrolysis is stopped. The solvent is substantially distilled off from the reaction mixture is a rotary evaporator at 60° C and 30 ml of saturated sodium chloride solution is added to the residue. The whole is then extracted with ether, the extract is separated from the aqueous phase and ether is removed from the organic phase. The residue is fractionally distilled. 9.9 g (43 percent of the theory) of 2,2-dimethoxy-5-phenyltetrahydrofuran- 3-carboxylic acid methyl ester having a boiling point of 114° to 115° C at 0.05 mm is obtained. By treatment with toluenesulfonic acid in 97 percent aqueous methanol, the γ-lactone of α-methoxycarbonyl-γ-phenyl-γ-hydroxybutyric acid is obtained. 1,1,6,6-tetramethoxy-carbonyl-3,4-diphenylhexane having a melting point of 131.5° to 132.5° C. is obtained from the distillation residue of the organic phase by chromatography on a silica gel column with ligroin and ether.

EXAMPLE 2

0.85 g of sodium is reacted with 20 g of dimethyl malonate. The reaction mixture is dissolved in 100 ml of anhydrous methanol and 100 ml of cyclohexane. The mixture is electrolyzed at platinum electrodes each having an area of 20 cm$^2$ spaced apart by 1 cm with an anode voltage of 0.8 volt and a current density of 5 milliamp/cm$^2$ at 20° C up to a consumption of 0.083 Faraday. During the electrolysis, the reaction mixture is circulated. Then the solvent is separated by distillation and the residue taken up in ether. The ethereal phase is washed with water and then dried with sodium sulfate. The ether is evaporated off. A residue of 17.8 remains which is distilled and then gas chromatographically analyzed. 8,4 g of dimethyl malonate, 1.02 g of dimethyl cyclohexylmalonate (7 percent current efficiency) and 1.57 g of dimethyl-2-cyclohexenylmalonate (11 percent current efficiency) are obtained.

EXAMPLE 3

A solution of 14.6 g of dimethyl malonate and 0.7 g of sodium in 160 ml of anhydrous methanol and 40 ml of vinyl ethyl ether is electrolyzed as in Example 1 at a current density of 25 milliamps/cm$^2$ and an anode potential of 0.8 volt up to a consumption of 0.162 Faraday. After processing as in Example 1 and fractional distillation, 7.1 g of methyl ethyl acetal of α-malonic ester acetaldehyde having a boiling point of 78° to 83° C at 0.01 mm is obtained. The current efficiency is 37 percent.

EXAMPLE 4

A solution of 18 g of dimethyl malonate and 1.1 g of sodium in 120 ml of anhydrous methanol and 90 ml of styrene is electrolyzed as described in Example 2 at 20° C at an anode potential of 0.65 volt and a current density of 20 milliamps/cm$^2$ up to a consumption of 0.167 Faraday. Volatile constituents are separated. 9.9 g (43 percent current efficiency) of 2,2-dimethoxy-5-phenyltetrahydrofuran-3 -carboxylic acid methyl ester having a boiling point of 114° to 115° C at 0.05 mm is obtained by fractional distillation. 6 g (15 percent current efficiency of 3,4-diphenyl-1, -tetracarboxylic acid tetramethyl ester having a melting point of 131.5° to 132.5° C is obtained from the residue by chromatography on silica gel with a 3 : 1 mixture of ligroin and diethyl ether.

EXAMPLE 5

29 g of ethyl acetoacetate and 0.046 g of sodium are dissolved in 120 ml of anhydrous methanol and 80 ml of freshly distilled styrene and electrolyzed at −20° C as described in Example 2 at an anode potential of +1 volt and a current density of 15 milliamps/cm$^2$ up to a consumption of 0.2 Faraday. By processing as in Example 2, 0.5 g (8.1 percent current efficiency) of 2,7-diacetyl-4,5-diphenylocatane-1,8-dicarboxylic acid methyl ester and 0.6 g (18 percent current efficiency) of 4-carbomethoxy-5-methyl-2-phenyl-2,3-dihydrofuran are obtained by chromatography on silica gel with a 1 : 1 mixture of diethyl ether and ligroin.

EXAMPLE 6

A solution of 25.5 g of ethyl acetoacetate and 0.1 g of sodium in 120 ml of anhydrous methanol and 80 ml of freshly distilled α-methylstyrene is electrolyzed at 20° C, an anode potential of +1 volt and a current density of 20 milliamps/cm$^2$ up to a consumption of 0.269 Faraday as described in Example 2. By processing as described in Example 2, 4.1 g of colorless crystals sparingly soluble in either and 29.7 g of liquid crude product are obtained. By distillation 5.3 g (equivalent to 15% current efficiency) of 4-carbomethoxy-5-methoxy-5-methyl-2-phenyltetrahydrofuran having a boiling point of 125° to 130° C at 0.01 mm is obtained. Further amounts of the abovementioned crystals are obtained from the distillation residue. Altogether 7.6 g (12.5 percent current efficiency) of 2,7-diacetyl-4,5-diemthyl-4,5-diphenyloctane having a melting point of 170° to 171° C is obtained.

EXAMPLE 7

15 g of acetylacetone and 0.25 g of sodium are dissolved in 130 ml of anhydrous ethanol and 70 ml of phenyl ether and the solution is electrolyzed at 20° C with an anode potential of +0.8 volt and a current density of 28 milliamps/cm$^2$ up t a consumption of 0.185 Faraday, as described in Example 2. By analogous processing, 13 g of crude product is obtained. By fractional distillation 5.7 g (36 percent current efficiency) of 4-acetyl-2-ethoxy-5-methyl-2,3-dihydrofuran having a boiling point of 78° to 80° C at 0.02 mm is obtained therefrom.

EXAMPLE 8

30 g of acetylacetone and 2.5 g of sodium are dissolved in 120 ml of anhydrous methanol and 80 ml of butadiene and electrolyzed at +2° C at a current density of 5 milliamps/cm$^2$ and an anode potential of +1.0 volt up to a consumption of 0.167 Faraday, according to Example 2, and then processed as described therein. 15.6 g of crude products is obtained from which 4.2 g is fractionally distilled. Two fractions are obtained:

a. 1.2 g having a boiling point of 130° to 136° C at 0.01 mm and b. 1.35 g having a boiling point of 160° to 175° C at 0.01 mm.

Both fractions give trans,trans-tetradeca-5,9-diene-2,1,3-dione having a boiling point of from 100° to 105° C at 0.01 mm upon treatment with ethanolic caustic potash solution (keto cleavage); this product is homogeneous by layer chromatography. Fraction (a) is the monoacetyl derivative and fraction (b) is the diacetyl derivative and these are converted by the keto cleavage into the homogeneous substance specified above.

EXAMPLE 9

A solution of 15 g of acetylacetone and 0.25 g of sodium in 130 ml of anhydrous methanol and 70 ml of freshly distilled styrene is electrolyzed at 20° C at an anode potential of +0.88 volt and a current density of 25 milliamps/cm$^2$ up to a consumption of 0.168 Faraday as described in Example 2. The solvent is then distilled off at 60° C in a rotary evaporator and the residue is neutralized with 5N sulfuric acid while cooling. The product is then isolated as described in Example 1. 4.2 g (15.6 percent of the theory) of 5,6-diphenyldecane-2,9-dione having a melting point of 157° to 158° C is obtained from the ethereal phase. After the ether has been distilled off, 18 g of a residue is left from which by gram chromatgraphy with a 9 : 1 mixture of ether and ligroin 2.0 g of 1-phenylpentanone1-4 and 6.4 g of 4-acetyl-5-methyl-2-phenyl-2,3-dihydrofuran having a boiling point of 120° to 125° C at 0.01 mm are obtained.

EXAMPLE 10

A solution of 20 g of acetylacetone and 0.46 g of sodium in 130 ml of anhydrous methanol and 70 ml of freshly distilled styrene is electrolyzed at −20° C, an anode potential of +0.8 volt and a current density of 25 milliamps/cm$^2$ up to a current consumption of 0.27 Faraday as described in Example 9. Then the solution is neutralized with dilute hydrochloric acid at −20° C and the solvent is removed in a rotary evaporator. 21 g of crude product remains after unreacted acetylacetone and styrene have been distilled off. 4-acetyl-5methyl-2-phenyl-2,3-dihydrofuran in obtained therefrom by fractional distillation with a current efficiency of 16 percent and 4-acetyl-5-methyl-5-methoxytetrahydrofuran with current efficiency of 27 percent

EXAMPLE 11

1 g of sodium dissolved in 20 ml of anhydrous methanol is added to 15 g of methyl cyanoacetate dissolved in 150 ml of anhydrous methanol and then 40 ml of styrene is added. The whole mixture is subjected to electrolysis at +20° C. The electrodes have their polarity reversed with a frequency of about 1 cycle per second. The anode potential is +0.8 volt and the current density is 30 milliamps/cm$^2$. After a consumption of 0.225 Faraday, the solvent is distilled off in a rotary evaporator and the residue is hydrolyzed with 50 ml of ice-water which is saturated with sodium chloride. Extraction with ether is then carried out and the extract is dried over sodium sulfate. Ether, excess styrene and unreacted methyl cyanoacetate are distilled off. A crude product is obtained which is chromatographed on a column of silica gel with a 3 : 1 mixture of either and ligroin 1.6 g (7 percent current efficiency) of 1-phenyl-1-methoxy-3-cyano-3-carbomethoxypropane is obtained.

EXAMPLE 12

15 g of methyl cyanoacetate dissolved in 150 ml of anhydrous methanol is mixed with 1 g of sodium dissolved in 20 ml of anhydrous methanol and 40 ml of vinyl ethyl ether is added. The solution is electrolyzed at an anode potential of +0.5 volt and a current density of 20 milliamps/cm$^2$ and a frequency of pole reversal of the electrodes of about 0.1 cycle per second at a temperature of −20° C up to a consumption of 0.15 Faraday. By processing as described in Example 11, 14.5 g of liquid crude product is obtained from which by chromatography on silicic acid with a 2.5 : 1 mixture of ether and 2,8 g (19 percent current efficiency) of 1-ethoxy-1-methoxy-3-cyano-3-carbomethoxy-propane having a boiling point of 76° to 78° C at 0.1 mm is obtained.

EXAMPLE 13

20 g of 2-nitropropane and 2.4 g of sodium are dissolved in 140 ml of anhydrous methanol and 60 ml of freshly distilled styrene and the solution is electrolyzed at an anode potential of +0.4 volt and a current density of 12 milliamps/cm$^2$ at room temperature in an electrolytic cell not having a diaphragm up to a consumption of 0.155 Faraday. Then the reaction mixture is processed as described in Example 2. The crude product obtained is digested with cold ether. 4.75 g of 2,3-dinitro-2,3-dimethylbutane is obtained and also, from the residual liquid product by preparative thin layer chromatography on silica gel with a 1 : 1 mixture of benzene and chloroform, 3.4 g (current efficiency 14.5 percent) of 2,7-dinitro-2,7-dimethyl-4,5-diphenylocatane and also 1-phenyl-1-methoxy-3-methyl-3-nitrobutane (current efficiency 4 percent).

EXAMPLE 14

A solution of 14 g of 2-nitropropane and 2.3 g of sodium in 40 ml of freshly distilled styrene and 80 ml of absolute methanol is electrolyzed at an anode potential of +0.75 volt and a current density of 25 milliamps/cm$^2$ at 25° C up to a consumption of 0.075 Faraday with a platinum anode in the anode chamber, and with 150 ml of methanol in which 12 g of sodium perchlorate is dissolved in the cathode chamber, the two chambers being separated by a diaphragm. The mixture is processed in analogy to the description in Example 2. 10.3 g of crude product is obtained. 1.7 g (26 percent current efficiency) of 2,3-dinitro-2,3-dimethylbutane is obtained therefrom by digestion with ether. 3.6 g (equivalent to 43.5 of the current efficiency) of 1-phenyl-1-methoxy-3-methyl-3-nitrobutane is obtained from the remaining liquid portion by preparative thin layer chromatography on silica gel with a 1: 1 mixture of chloroform and ligroin.

EXAMPLE 15

The procedure as described in Example 14 is followed but the anode chamber is charged with a solution of 2-nitropropane and 2.1 g of sodium in 80 ml of anhydrous methanol and 60 ml of freshly distilled vinyl ether. The electrolysis is carried out at an anode potential of +0.35 volt and a current density of 17 milliamps/cm$^2$ up t a consumption of 0.084 Faraday. Isolation by the procedure of Example 15 gives 1-methoxy-1-ethoxy-3-nitro-3-methylbutane with a current efficiency of 17 percent by tin layer chromatography.

EXAMPLE 16

A solution of 0.5 g of sodium and 15 g of nitroethane in 60 ml of freshly distilled styrene and 150 ml of anhydrous methanol is electrolyzed with a current density of 35 milliamps/cm$^2$ and an anode potential of from +0.65 to +0.85 volt at room temperature up to a consumption of 0.145 Faraday in a cell devoid of a diaphragm. By processing as in Example 2, 11.4 g of crude product is obtained which is fractionally distilled. The fraction boiling at 100° to 130° C at 0.1 mm is treated by thin layer chromatography on silica gel with a 1 : 1 mixture of chloroform and benzene. 1-phenyl-1-methoxy-3-nitrobutane is obtained at a current efficiency of 14.8 percent.

EXAMPLE 17

An electrolytic cell without a diaphragm and provided with a mercury cathode and a graphite anode is charged with a solution of 4 g of lithium azide in 100 ml of absolute methanol and 50 ml of freshly distilled styrene. Electrolysis is carried out with an anode potential of +0.65 to +0.7 volt and a current density of 25 to 40 milliamps/cm$^2$ up to a consumption of 0.075 Faraday. The methanol is then distilled off in a rotary evaporator and the residue is extracted with ether. After the ether extract has been washed with water, it is dried and treated with lithium aluminum hydride. The amines formed are then recovered from the solution by treatment with sulfuric acid followed by addition of alkali in the usual way. 1-phenyl-1-methoxy-2-aminoethane having a boiling point of 35° to 40° C at 0.01 mm is obtained with a current efficiency of 25 percent, 1,4-diamino-2,3-diphenylbutane having a boiling point of 120° to 130° C at 0.01 mm with a current efficiency of 7.5 percent and also 1,4-diphenyl-1,4-diamino-butane.

EXAMPLE 18

A solution of 11 g of sodium azide in 60 ml of freshly distilled styrene and 140 ml of anhydrous glacial acetic acid is electrolyzed at 40° C at an anode potential of +1.8 volts and a current density of 25 milliamps/cm$^2$ up to a current consumption of 0.108 Faraday in a cell without a diaphragm having platinum electrodes. The styrene and glacial acetic acid are then substantially distilled off in a rotary evaporator and the residue is treated as described in Example 2. The crude product obtained is dissolved in 20 ml of methanol and hydrogenated with less than 50 atmospheres of hydrogen at room temperature with Raney nickel as catalyst. 1.56 g (70 percent current efficiency) of 1,4-diamino-2,3-diphenylbutane is obtained by fractional distillation.

EXAMPLE 19

The procedure of Example 18 is followed but 60 ml of cyclohexene is used instead of styrene. 2,2'-diaminodicyclohexane having a boiling point of 65° to 70° C at 0.02 mm is obtained with a current efficiency of 27 percent.

EXAMPLE 20

A solution of 0.2 mole of n-butyl magnesium bromide in 140 ml of ether and 60 ml of freshly distilled styrene is electrolyzed at 20° to 30° C in an electrolytic cell not having a diaphragm at a current density of 5 to 10 milliamps/cm$^2$ with platinum electrodes up to a current consumption of 0.1 Faraday. The solution obtained is hydrolyzed with ice and the organic phase is separated. 2N sulfuric acid is added to the aqueous phase until the precipitate has dissolved and the aqueous solution is extracted with ether. The etheral extracts are combined, washed and dried. After the ether has been distilled off a residue is obtained which is fractionally distilled. 5,7-diphenyldodecane is obtained with a current efficiency of 13 percent and 6,7-diphenyldodecane with a current efficiency of 6 percent.

EXAMPLE 21

The procedure of Example 20 is followed but 8 g of lithium perchlorate is used as electrolyte salt and roughened copper sheet as electrodes. By analogous processing, 5.7 g (30 percent current efficiency) of 6,7-diphenyldodecane having a melting point of 75° to 76° C is obtained after a current consumption of 0.117 Faraday.

I claim:

1. A process for adding on to an olefinically unsaturated compound in which the olefinic double bond is not activated and which is not accessible to the Michael reaction an anion having the formula Z$^{(-)}$ selected from the class consisting of:
   a. R$^{1(-)}$—CH—R$^2$ where each of R$^1$ and R$^2$ denotes an acyl group having two to ten carbon atoms, a carboxylic ester group having two to ten carbon atoms derived from an aliphatic, cycloaliphatic, araliphatic alcohol having up to nine carbon atoms or phenol, a nitrile group, a phenyl group, or a sulphone group bearing as a substituent an aliphatic, cycloaliphatic, araliphatic or aromatic radical having up to 10 carbon atoms;
   b. R$^{3(-)}$—CX—R$^4$ where each of R$^3$ and R$^4$ denotes a hydrogen atom or an aliphatic, cycloaliphatic, araliphatic or aromatic radical having up to 10 carbon atoms and X denotes a nitro group;
   c. R$^5$—C$^{(-)}$C where R$^5$ denotes a hydrogen atom or an alkyl radical having one to four carbon atoms or a phenyl radical;
   d. a cyanide anion or an azide anion; and
   e. the anion R$^{(-)}$ of the compound R$^{(-)}$MgX$^{(+)}$ where R denotes an aliphatic, cycloaliphatic, araliphatic or aromatic radical and X denotes a chlorine atom or a bromine atom;

which process comprises anodically oxidizing a starting compound containing said anion having the formula Z$^{(-)}$ in the presence of said olefinically unsaturated compound at a temperature of from −10° to +100° C and an anode potential of from 0.1 to 2.0 volts, measured against a silver/silver chloride electrode, and in the presence of an alkanol having one to four carbon atoms, an aliphatic nitrile having two or three carbon atoms, dimethyl sulfoxide or dimethyl formamide.

2. A process as claimed in claim 1 wherein the starting compound is dialkyl malonate, an acetoacetic ester, acetylacetonate, a cyanoacetic alkyl ester, a nitroalkane, an azide an alkyl magnesium chloride or bromide or a phenyl magnesium chloride or bromide.

3. A process as claimed in claim 1 wherein an aliphatic olefin having three to 20 carbon atoms, a cycloaliphatic olefin having five to 12 carbon atoms, a phenyl ether having three to 10 carbon atoms, styrene or naphthalene is used as the olefinically unsaturated compound in which the olefinic double bond is not activated.

4. A process as claimed in claim 1 wherein from 1 to 100 moles of olefinically unsaturated compound in which the double bond is not activated is used per mole of anionic compound.

5. A process as claimed in claim 1 carried out at a temperature of from 0° to 60° C.

* * * * *

PO-1050
(5/69)

UNITED STATES PATENT OFFICE
CERTIFICATE OF CORRECTION

Patent No. 3,658,666          Dated April 25, 1972

Inventor(s) Hans Schaefer

It is certified that error appears in the above-identified patent and that said Letters Patent are hereby corrected as shown below:

Column 2, line 4, "$R^5$-C C" should read -- $R^5$-C≡C --; lines 45 to 47, that portion of the formula reading "CH  O" should read
-- CH  O --.
   C
                                                       C Column 3, line 28, "elctrolysis" should read -- electrolysis --; line 29, "is a rotary" should read -- in a rotary --; line 60, "8,4 g of" should read -- 8.4 g of --.

Column 4, line 12, "3,4-diphenyl-1," should read
-- 3,4-diphenyl-1,1,6,6 --; line 26, "2,7-diacetyl-4,5-diphenylocatane-1,8-dicarboxylic" should read
-- 2,7-diacetyl-4,5-diphenyloctane-1,8-dicarboxylic --; line 47, "2,7-diacetyl-4,5-diemthyl-4,5-diphenyloctane" should read
-- 2,7-diacetyl-4,5-dimethyl-4,5-diphenyloctane --; line 55, "up t a" should read -- up to a --.

Column 5, line 24, "1-phenylpentanone1-4" should read
-- 1-phenylpentanone-4 --.

Column 6, line 1, "2,8" should read -- 2.8 --; line 19, "diphenylocatane" should read -- diphenyloctane --; line 51, "tin layer" should read -- thin layer --.

Column 8, line 20, claim 1, "$R^5$-C$^{(-)}$ C" should read
-- $R^5$-C$^{(-)}$≡C --.

Signed and sealed this 21st day of November 1972.

(SEAL)
Attest:

EDWARD M. FLETCHER, JR.
Attesting Officer

ROBERT GOTTSCHALK
                                        Commissioner of Patents